(12) United States Patent
Hayashi et al.

(10) Patent No.: US 8,463,512 B2
(45) Date of Patent: Jun. 11, 2013

(54) CONSTRUCTION MACHINE

(75) Inventors: Kazuhiko Hayashi, Komatsu (JP);
Mitsuhiko Kamado, Hirakata (JP);
Tomohiro Nakagawa, Hirakata (JP)

(73) Assignee: Komatsu Ltd., Tokyo (JP)

( * ) Notice: Subject to any disclaimer, the term of this patent is extended or adjusted under 35 U.S.C. 154(b) by 15 days.

(21) Appl. No.: 13/249,806

(22) Filed: Sep. 30, 2011

(65) Prior Publication Data
US 2013/0081836 A1   Apr. 4, 2013

(51) Int. Cl.
*E02F 3/76* (2006.01)
*G01S 5/02* (2010.01)
*G01C 21/00* (2006.01)

(52) U.S. Cl.
USPC .................................. 701/50; 172/2; 172/4.5

(58) Field of Classification Search
USPC ............... 37/342, 348, 419, 414, 314, 319,
37/417; 172/2–11; 701/50, 213; 414/699,
414/273; 702/1, 2, 33, 36, 41, 44, 47, 50,
702/100, 101, 104, 105, 138, 140, 150, 151,
702/154, 173–175
See application file for complete search history.

(56) References Cited

U.S. PATENT DOCUMENTS

| 5,621,643 A | 4/1997 | Nakagami et al. | |
| 5,875,854 A * | 3/1999 | Yamamoto et al. | 172/4.5 |
| 5,950,141 A * | 9/1999 | Yamamoto et al. | 702/41 |
| 5,951,613 A | 9/1999 | Sahm et al. | |
| 6,044,921 A * | 4/2000 | Lansberry | 180/9.36 |
| 6,062,317 A * | 5/2000 | Gharsalli et al. | 172/2 |
| 6,068,060 A | 5/2000 | Ohtomo et al. | |
| 6,845,311 B1 * | 1/2005 | Stratton et al. | 701/50 |
| 7,451,126 B2 * | 11/2008 | Hisano et al. | 706/50 |
| 8,082,084 B2 * | 12/2011 | Nichols | 701/50 |

FOREIGN PATENT DOCUMENTS

| JP | 5-106239 A | 4/1993 |
| JP | 06-173292 A | 6/1994 |
| JP | 10-141955 A | 5/1998 |
| JP | 11-256620 A | 9/1999 |
| JP | 2009-243262 A | 10/2009 |
| JP | 2010-505052 A | 2/2010 |

OTHER PUBLICATIONS

International Search Report and Written Opinion of International Search Authority of corresponding PCT Application No. PCT/JP2012/073135 dated Nov. 6, 2012.

* cited by examiner

*Primary Examiner* — Robert Pezzuto
(74) *Attorney, Agent, or Firm* — Global IP Counselors, LLP

(57) ABSTRACT

A bulldozer of the present invention includes a GPS receiver which is fixed to a vehicle body of the bulldozer, and angle obtaining part which stores a conversion table in which a combination of an angling cylinder length and a tilt cylinder length are matched with a combination of a blade angling angle and a blade tilting angle.

6 Claims, 5 Drawing Sheets

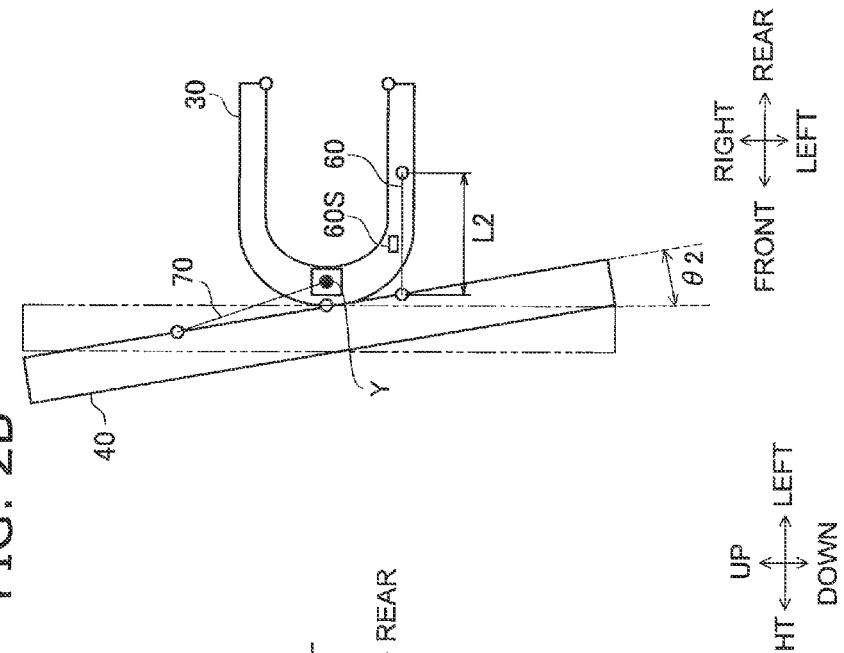
FIG. 2A
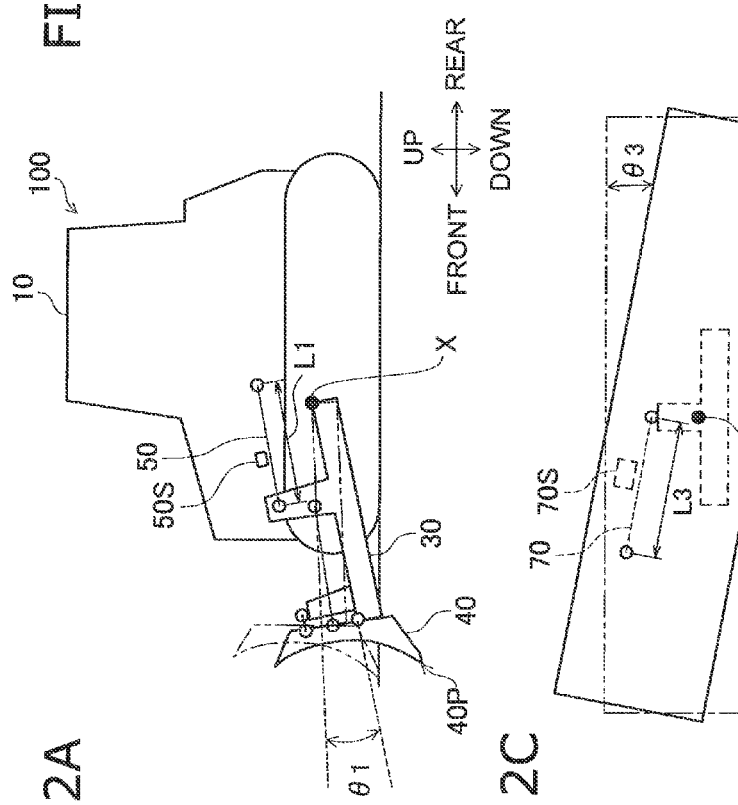
FIG. 2B
FIG. 2C

| DATA No. | HORIZONTAL TILT CYLINDER LENGTH L2 (mm) | VERTICAL TILT CYLINDER LENGTH L3 (mm) | HORIZONTAL TILT ANGLE θ2 (deg) | VERTICAL TILT ANGLE θ3 (deg) |
|---|---|---|---|---|
| 0 | 1035.0 | 600.0 | 33.904 | 59.990 |
| 1 | 935.0 | 637.5 | 47.235 | 64.504 |
| 2 | 1135.0 | 562.5 | 20.475 | 55.630 |
| 3 | 985.0 | 581.3 | 39.143 | 57.572 |
| 4 | 1185.0 | 656.3 | 17.999 | 67.295 |
| 5 | 885.0 | 618.8 | 52.482 | 62.098 |
| 6 | 1085.0 | 543.8 | 25.991 | 53.277 |
| 7 | 960.0 | 553.1 | 41.149 | 53.981 |
| 8 | 1160.0 | 628.1 | 19.895 | 63.725 |
| 9 | 860.0 | 665.6 | 57.806 | 68.409 |
| 10 | 1060.0 | 590.6 | 30.590 | 59.912 |
| 11 | 910.0 | 571.9 | 47.670 | 56.091 |
| 12 | 1110.0 | 646.9 | 26.778 | 65.841 |
| 13 | 1010.0 | 609.4 | 37.212 | 61.079 |
| 14 | 1210.0 | 534.4 | 9.781 | 51.980 |
| 15 | 1022.5 | 539.1 | 33.343 | 52.533 |
| 16 | 1222.5 | 614.1 | 11.373 | 62.222 |
| 17 | 922.5 | 651.6 | 49.358 | 66.313 |
| 18 | 1122.5 | 576.6 | 22.523 | 57.335 |
| 19 | 872.5 | 595.3 | 53.040 | 58.989 |
| 20 | 1072.5 | 670.3 | 32.271 | 68.602 |
| 21 | 972.5 | 632.8 | 42.567 | 63.916 |
| 22 | 1172.5 | 557.8 | 15.571 | 55.061 |
| 23 | 897.5 | 548.4 | 48.365 | 52.961 |
| 24 | 1097.5 | 623.4 | 27.332 | 62.966 |
| 25 | 997.5 | 660.9 | 40.778 | 67.402 |
| 26 | 1197.5 | 585.9 | 13.437 | 58.606 |
| 27 | 947.5 | 567.2 | 43.079 | 55.681 |
| 28 | 1147.5 | 642.2 | 22.024 | 65.397 |
| 29 | 847.5 | 604.7 | 56.498 | 60.179 |
| 30 | 1047.5 | 529.7 | 30.080 | 51.472 |
| 31 | 941.3 | 532.0 | 42.708 | 51.193 |
| 32 | 1141.3 | 607.0 | 21.361 | 61.089 |
| 33 | 841.3 | 644.5 | 59.139 | 65.624 |
| 34 | 1041.3 | 569.5 | 32.091 | 56.309 |
| 35 | 891.3 | 588.3 | 50.503 | 58.131 |
| 36 | 1091.3 | 663.3 | 29.726 | 67.784 |
| 37 | 991.3 | 625.8 | 40.063 | 63.061 |
| 38 | 1191.3 | 550.8 | 12.883 | 54.156 |
| 39 | 866.3 | 560.2 | 52.484 | 54.259 |
| 40 | 1066.3 | 635.2 | 31.541 | 64.315 |
| 41 | 966.3 | 672.7 | 45.038 | 68.902 |
| 42 | 1166.3 | 597.7 | 17.882 | 60.002 |
| 43 | 1016.3 | 578.9 | 35.374 | 57.379 |
| 44 | 1216.3 | 653.9 | 13.959 | 67.195 |
| 45 | 916.3 | 616.4 | 48.607 | 61.817 |
| 46 | 1116.3 | 541.4 | 22.083 | 53.026 |
| 47 | 928.8 | 536.7 | 44.316 | 51.695 |
| 48 | 1128.8 | 611.7 | 23.079 | 61.627 |
| 49 | 1028.8 | 649.2 | 36.574 | 65.970 |

FIG. 5

CONSTRUCTION MACHINE

BACKGROUND

1. Technical Field

The present invention relates to a construction machine configured to recognize a global position of a work implement.

2. Background Art

It has been widely known that GPS (Global Positioning System) allows to recognize a global position of a work implement in the global coordinate system (e.g., see Japan Laid-open Patent Application Publication No. JP-A-H10-141955). The method of the publication No. JP-A-H10-141955 is intended to reduce computation load in obtaining the global position of the work implement based on GPS data indicating the global position of the work implement, GPS receiver, configured to receive the GPS data, is disposed on the work implement not on a vehicle body.

SUMMARY

However, since the GPS receiver is disposed on the work implement in the method of the publication No. JP-A-H10-141955, vibration of the work implement may be directly transferred to the GPS receiver and this may inhibit the GPS receiver from accurately receiving the GPS data. Further, it is required to protect the GPS receiver from earth and sand splashed by the work implement. When the GPS receiver is disposed on the vehicle body, by contrast, since it is required to consider the lengths of multiple cylinders disposed between the vehicle body and the work implement in calculating the global position of the working unit, system-related processing load is thereby increased.

The present invention has been produced in view of the above drawback and is intended to provide a construction machine for protecting a GPS receiver and causing the GPS receiver to accurately receive the GPS data, and simultaneously, for easily and simply calculating the global position of a work implement.

A construction machine according to a first aspect of the present invention includes a vehicle body, a lift frame vertically pivotably attached to the vehicle body, a work implement supported by a tip of the lift frame, a lift cylinder, an angling cylinder, a tilt cylinder, an angle obtaining part configured to obtain a blade lifting angle, a blade angling angle and a blade tilting angle based on a lift cylinder length of the lift cylinder, an angling cylinder length of the angling cylinder and a tilt cylinder length of the tilt cylinder, a GPS receiver fixed to the vehicle body, the GPS receiver configured to receive GPS data indicating a position of the GPS receiver and a global position obtaining part configured to obtain a position of the work implement in a global coordinate system based on the GPS data, the blade lifting angle, the blade angling angle and the blade tilting angle, the GPS data being received by the GPS receiver, the blade lifting angle, the blade angling angle and the blade tilting angle being obtained by the angle obtaining part. The angle obtaining part stores a conversion table for matching a combination of the angling cylinder length and the tilt cylinder length with a combination of the blade angling angle and the blade tilting angle.

According to the construction machine of the first aspect of the present invention, since vibrations of the blade can be inhibited from being directly transferred to the GPS receiver, the GPS receiver can accurately receive the GPS data. Further, the GPS receiver can be protected from earth and sand splashed by the blade. Yet further, the blade angling angle and the blade tilting angle can be obtained much easier than a case that the blade angling angle and the blade tilting angle are calculated based on the angling cylinder length and the tilt cylinder length using a complex geometric calculation. The processing load can be thus reduced in the construction machine.

In a construction machine according to a second aspect of the present invention relating to the first aspect, the conversion table is used for converting the lift cylinder length into the blade lifting angle.

According to the construction machine of the second aspect of the present invention, since it is not required to calculate the blade lifting angle from the lift cylinder length, the processing load can be further reduced.

In a construction machine according to a third aspect of the present invention relating to one of the first and second aspects, the GPS receiver is disposed on the vehicle body.

According to the construction machine of the third aspect of the present invention, since the GPS receiver can be inhibited from being concealed by the vehicle body, the GPS receiver can more accurately receive the GPS data.

In a construction machine according to a fourth aspect of the present invention relating to the third aspect, the GPS receiver is disposed on the center part of the construction machine in a right-and-left direction.

A construction machine according to a fifth aspect of the present invention relating to the first aspect, the conversion table is created by sequentially matching the combination of the angling cylinder length and the tilt cylinder length with the combination of the blade angling angle and the blade tilting angle in a three-dimensional model formed based on the vehicle body, the lift frame, the work implement, the lift cylinder, the angling cylinder and the tilt cylinder.

A construction machine according to a sixth aspect of the present invention relating to the first aspect further includes a drive unit having a pair of tracks attached to the vehicle body.

Overall, according to the present invention, it is possible to provide a construction machine for protecting a GPS receiver and causing the GPS receiver to accurately receive the GPS data, and simultaneously, for easily and simply calculating the global position of a work implement.

BRIEF DESCRIPTION OF THE DRAWINGS

Referring now to the attached drawings which form a part of this original disclosure:

FIG. 2A is a side view of a blade;

FIG. 2B is a top view of the blade;

FIG. 2C is a front view of the blade;

FIG. 5 is a conversion table representing a relation among cylinder lengths and angles.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

With reference to attached figures, a bulldozer will be hereinafter explained as an exemplary "construction machine". In the following explanation, the terms "up", "down", "front", "rear", "right" and "left" and their related terms should be understood as directions seen from an operator seated on an operator's seat.

Overall Structure of Bulldozer 100

Figure 1:
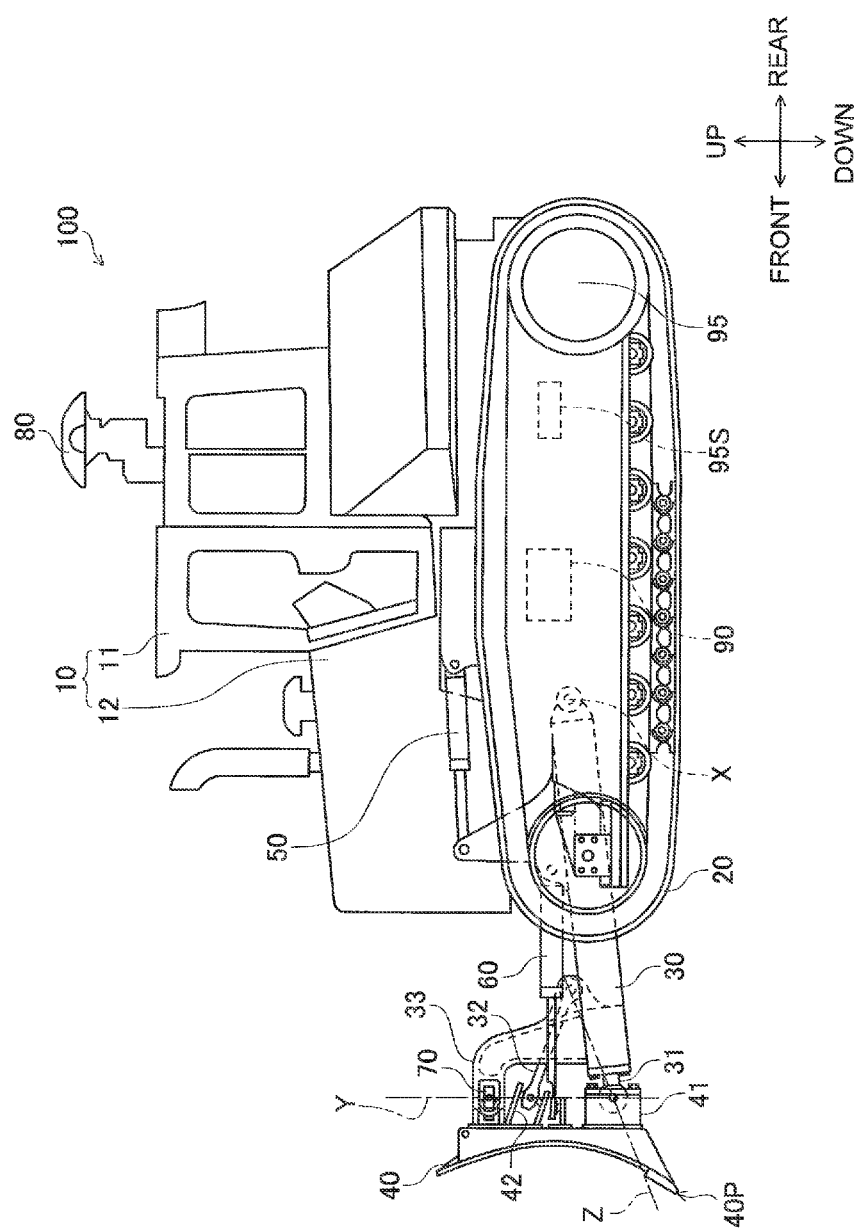
FIG. 1 is a side view of the entire structure of a bulldozer.

FIG. 1 is a side view of the entire structure of a bulldozer 100 according to an exemplary embodiment of the present invention.

The bulldozer 100 includes a vehicle body 10, a drive unit 20, a lift frame 30, a blade 40, a lift cylinder 50, an angling cylinder 60, a tilt cylinder 70, a GPS receiver 80 and an IMU (Inertial Measurement Unit) 90. Further, the bulldozer 100 is embedded with a work implement position recognizing system 200. The structure and actions of the work implement position recognizing system 200 will be hereinafter described.

The vehicle body 10 includes a cab 11 and an engine compartment 12. Although not illustrated in the figures, the cab 11 is equipped with a seat and a variety of operating devices. The engine compartment 12 is disposed forwards of the cab 11.

The drive unit 20 is formed by a pair of tracks (only the left-side one is illustrated in FIG. 1) and attached to the bottom of the vehicle body 10. The bulldozer 100 is configured to travel in conjunction with circulation of the pair of tracks.

The lift frame 30 is disposed inwards of the drive unit 20 in the right-and-left direction of the bulldozer 100. The lift frame 30 is attached to the vehicle body 10 while being vertically pivotable about an axis X (as an exemplary "first axis") arranged in parallel to the right-and-left direction. The lift frame 30 supports the blade 40 through a ball-and-socket joint 31, a pitching support link 32 and a bracing strut 33.

The blade 40 is disposed forwards of the vehicle body 10. The blade 40 is supported by the lift frame 30 through a universal coupling 41 coupled to the ball-and-socket joint 31 and a pitching coupling 42 coupled to the pitching support link 32 The blade 40 is configured to be lifted up or down in conjunction with upward or downward pivot of the lift frame 30. The blade 40 includes a cutting edge 40P which is shoved into the ground in grading or digging on the bottom end thereof.

The lift cylinder 50 is coupled to the vehicle body 10 and the lift frame 30. In conjunction with extension or contraction of the lift cylinder 50, the lift frame 30 is configured to pivot up and down about the axis X.

The angling cylinder 60 is coupled to the lift frame 30 and the blade 40. In conjunction with extension or contraction of the angling cylinder 60, the blade 40 is configured to be tilted about an axis Y (an exemplary "second axis") passing through the rotary center of the universal coupling 41 and that of the pitching coupling 42.

The tilt cylinder 70 is coupled to the bracing strut 33 of the lift frame 30 and the right upper end of the blade 40. In conjunction with extension or contraction of the tilt cylinder 70, the blade 40 is configured to pivot about an axis Z (an exemplary "third axis") connecting the ball-and-socket joint 31 and the bottom end of the pitching support link 32.

The GPS receiver 80 is disposed on the center of the vehicle body 10 in the right-and-left direction. The right-and-left direction herein refers to a right-and-left direction based on an operator seated on the operator's seat. The GPS receiver 80 is a GPS (Global Positioning System) antenna. The GPS receiver 80 is configured to receive GPS data indicating its own global position. The GPS receiver 80 is configured to transmit the received GPS data to a global position obtaining part 230 (see FIG. 3) to be described.

The IMU 90 is configured to obtain vehicle body tilting angle data indicating tilting angles of the vehicle body in the front-and-rear and right-and-left directions. The IMU 90 is configured to transmit the vehicle body tilting angle data to the global position obtaining part 230.

Now, FIGS. 2A to 2C are schematic configuration diagrams of the bulldozer 100. Specifically, FIG. 2A is a side view of the blade 40, FIG. 2B is a top view of the blade 40, and FIG. 2C is a front view of the blade 40. In each of FIGS. 2A to 2C, an original position of the lift frame 30 is depicted with a dashed two-dotted line. When the lift frame 30 is positioned in the original position, the cutting edge 40P of the blade 40 is configured to make contact with the horizontal ground.

As illustrated in FIGS. 2A to 2C, the bulldozer 100 includes a lift cylinder sensor 50S, an angling cylinder sensor 60S and a tilt cylinder sensor 70S. Each of the lift cylinder sensor 50S, the angling cylinder sensor 60S and the tilt cylinder sensor 70S is formed by a rotatable roller which is configured to detect the position of a cylinder rod and a magnetic sensor which is configured to return the cylinder rod to the original position.

As illustrated in FIG. 2A, the lift cylinder sensor 50S is configured to detect the stroke length of the lift cylinder 50 (hereinafter referred to as "a lift cylinder length L1") and transmit the detected lift cylinder length L1 to an angle obtaining part 210 (see FIG. 3) to be described. In turn, the angle obtaining part 210 is configured to calculate a blade lifting angle $\theta 1$ of the blade 40 based on the lift cylinder length L1. In the present exemplary embodiment, the blade lifting angle $\theta 1$ corresponds to a lowered angle of the blade 40 from the original position, i.e., the depth of the cutting edge 40P shoved into the ground. A method of calculating the blade lifting angle $\theta 1$ will be hereinafter described.

As illustrated in FIG. 2B, the angling cylinder sensor 60S is configured to detect the stroke length of the angling cylinder 60 (hereinafter referred to as "an angling cylinder length L2") and transmit the detected angling cylinder length L2 to the angle obtaining part 210. As illustrated in FIG. 2C, the tilt cylinder sensor 70S is configured to detect the stroke length of the tilt cylinder 70 (hereinafter referred to as "a tilt cylinder length L3") and transmit the detected tilt cylinder length L3 to the angle obtaining part 210. The angle obtaining part 210 is configured to obtain a blade angling angle $\theta 2$ and a blade tilting angle $\theta 3$ of the blade 40 based on the angling cylinder length L2 and the tilt cylinder length L3.

In the present exemplary embodiment, the blade lifting angle $\theta 1$ can be calculated only from the lift cylinder length L1, but the blade angling angle $\theta 2$ cannot be calculated only from the angling cylinder length L2 and the blade tilting angle $\theta 3$ cannot be calculated only from the tilt cylinder length L3. This is due to the fact that a tilt action is caused in conjunction with an angle operation even under the condition that the stroke length of the tilt cylinder 70 is kept constant when the stroke length of the angling cylinder 60 is changed as illustrated in FIG. 2B.

Structure of Work Implement Position Recognizing System 200

Figure 3:
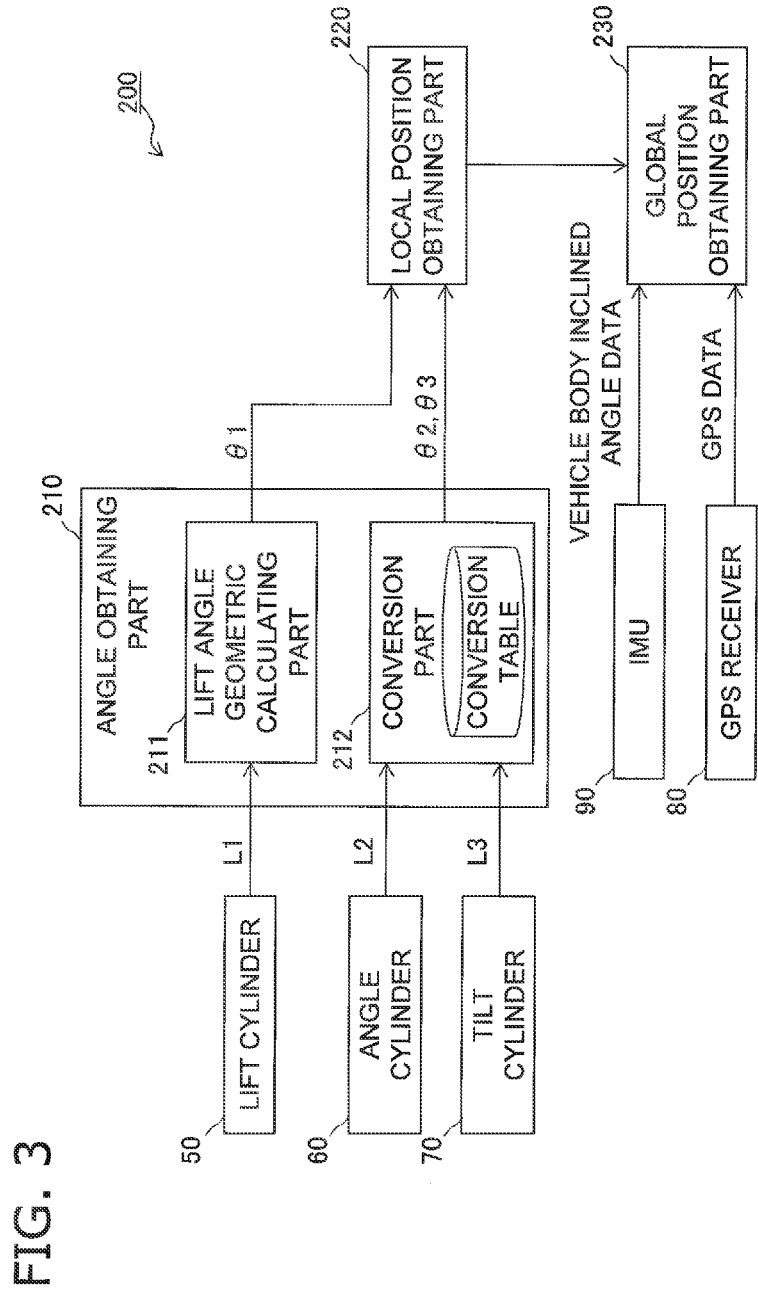
FIG. 3 is a configuration block diagram of a work implement position recognizing system.

FIG. 3 is a block diagram of the structure of the work implement position recognizing system 200 according to the present exemplary embodiment.

The work implement position recognizing system 200 includes the angle obtaining part 210, a local position obtaining part 220 and the global position obtaining part 230 in addition to the aforementioned elements including the lift cylinder sensor 50S, the angling cylinder sensor 60S, the tilt cylinder sensor 70S, the GPS receiver 80 and the IMU 90.

The angle obtaining part 210 is configured to obtain the blade lifting angle $\theta 1$ (see FIG. 2A) about the axis X, the blade angling angle $\theta 2$ (see FIG. 2B) about the axis Y and the blade tilting angle $\theta 3$ (see FIG. 2C) about the axis Z based on the lift cylinder length L1 of the lift cylinder 50, the angling cylinder length L2 of the angling cylinder 60 and the tilt cylinder length L3 of the tilt cylinder 70.

As represented in FIG. 3, the angle obtaining part 210 further includes a blade lifting angle geometric calculating part 211 and a conversion part 212.

Figure 4:
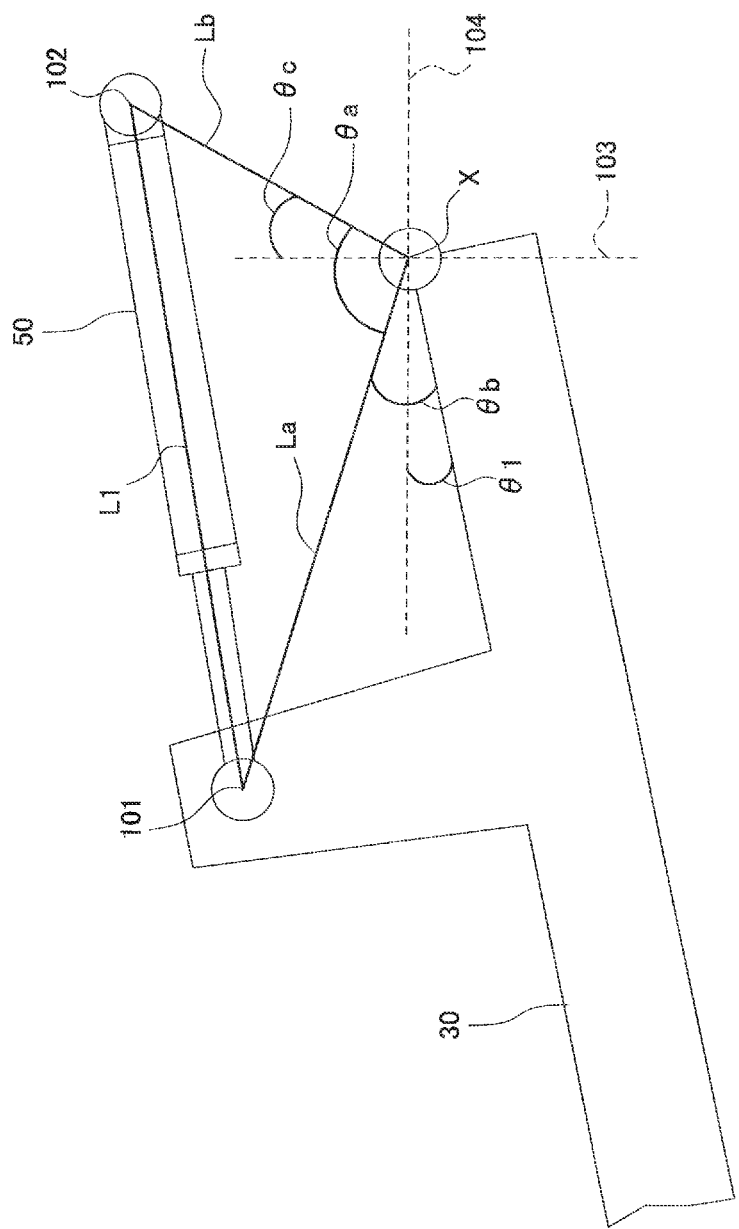
FIG. 4 is a schematic diagram for explaining a method of calculating a blade lifting angle.

The blade lifting angle geometric calculating part 211 is configured to calculate the blade lifting angle $\theta 1$ based on the lift cylinder length L1. Now, FIG. 4 is a partially enlarged view of FIG. 2A and schematically explains a method of calculating the blade lifting angle $\theta 1$. As represented in FIG. 4, the lift cylinder 50 is attached to the lift frame 30 while being pivotable about a front-side rotary axis 101 and attached to the vehicle body 10 while being rotatable about a rear-side rotary axis 102. FIG. 4 depicts a vertical line 103 which is a straight line arranged along the vertical direction and an original position indicating line 104 which is a straight line indicating the original position of the blade 40. Further, a first length La is the length of a straight line segment connecting the front-side rotary axis 101 and the axis X of the lift frame 30, whereas a second length Lb is the length of a straight line segment connecting the rear-side rotary axis 102 and the axis X of the lift frame 30. Further, a first angle $\theta a$ is formed between the front-side rotary axis 101 and the rear-side rotary axis 102 around the axis X as the vertex of the first angle $\theta a$, and a second angle $\theta b$ is formed between and the front-side rotary axis 101 and the upper face of the lift frame 30 around the axis X as the vertex of the first angle $\theta b$, and a third angle $\theta c$ is formed between the rear-side rotary axis 102 and the vertical line 103 around the axis X as the vertex of the first angle $\theta c$. The first length La, the second length Lb, the second angle $\theta b$ and the third angle $\theta c$ are fixed values and are stored in the angle obtaining part 210. Radian is herein set as the unit for the second angle $\theta b$ and that of the third angle $\theta c$.

First, the blade lifting angle geometric calculating part 211 is configured to calculate the first angle $\theta a$ using the following equations (1) and (2) based on the law of cosines.

$$L1^2 = La^2 + Lb^2 - 2LaLb \times \cos(\theta a) \quad (1)$$

$$\theta a = \cos^{-1}((La^2 + Lb^2 - L1^2)/2LaLb) \quad (2)$$

Next, the blade lifting angle geometric calculating part 211 is configured to calculate the blade lifting angle $\theta 1$ using the following equation (3).

$$\theta 1 = \theta a + \theta b - \theta c - \pi/2 \quad (3)$$

Next, the blade lifting angle geometric calculating part 211 is configured to output the calculated blade lifting angle $\theta 1$ to the local position obtaining part 220.

The conversion part 212 stores a conversion table in which a combination of the angling cylinder length L2 and the tilt cylinder length L3 is matched with a combination of the blade angling angle $\theta 2$ and the blade tilting angle $\theta 3$. FIG. 5 represents an exemplary conversion table stored in the conversion part 212. The conversion part 212 is configured to obtain the blade angling angle $\theta 2$ and the blade tilting angle $\theta 3$ with reference to the conversion table stored therein. The conversion part 212 is configured to output the blade angling angle $\theta 2$ and the blade tilting angle $\theta 3$ to the local position obtaining part 220.

It should be noted that the aforementioned conversion table can be theoretically created by sequentially matching the combination of the angling cylinder length L2 and the tilt cylinder length L3 with the combination of the blade angling angle $\theta 2$ and the blade tilting angle $\theta 3$ in a three-dimensional model formed based on the vehicle body 10, the lift frame 30, the blade 40, the lift cylinder 50, the angling cylinder 60 and the tilt cylinder 70. In other words, using the three-dimensional model data of the bulldozer 100 in a three-dimensional model analyzing software, the conversion table can be created by computing the combination of the blade angling angle $\theta 2$ and the blade tilting angle $\theta 3$ where the combination of the angling cylinder length L2 and the tilt cylinder length L3 is variously changed.

It should be noted that the conversion table may be created by matching on the bulldozer 100. Specifically, actually using the bulldozer 100, the conversion table can be created by actually measuring the combination of the blade angling angle $\theta 2$ and the blade tilting angle $\theta 3$ where the combination of the angling cylinder length L2 and the tilt cylinder length L3 is actually changed little by little.

The local position obtaining part 220 is configured to obtain the blade lifting angle $\theta 1$, the blade angling angle $\theta 2$ and the blade tilting angle $\theta 3$ from the angle obtaining part 210. Further, the local position obtaining part 220 stores the vehicle body size data of the entire bulldozer 100. The local position obtaining part 220 is configured to obtain the position of the cutting edge 40P of the blade 40 (hereinafter referred to as "a local position") in a coordinate system in the vehicle body 10 (hereinafter referred to as "a local coordinate system") in consideration of the blade lifting angle $\theta 1$, the blade angling angle $\theta 2$, the blade tilting angle $\theta 3$ and the vehicle body size data. The local position obtaining part 220 is configured to output the local position to the global position obtaining part 230.

The global position obtaining part 230 is configured to obtain the local position from the local position obtaining part 220. Further, the global position obtaining part 230 is configured to obtain the GPS data from the GPS receiver 80 and obtain the vehicle body tilting angle data from the IMU 90. The global position obtaining part 230 is configured to obtain the position of the cutting edge 40P (hereinafter referred to as "a global position") of the blade 40 in the global coordinate system based on the local position, the GPS data and the vehicle body tilting angle data. In short, the global position obtaining part 230 is configured to convert the local position of the cutting edge 40P into the global position thereof Accordingly, the work implement position recognizing system 200 can recognize the global position of the blade 40 (the cutting edge 40P).

Although not illustrated in the figures, the bulldozer 100 can obtain the relative position of the cutting edge 40P with respect to a designed surface by matching the global position with the designed surface which refers to a three-dimensionally designed landform indicating a target contour of an object for digging. Using the relative position, the bulldozer 100 can execute a well-known grading control for causing the cutting edge 40P to track the designed surface.

Working Effects (1) The bulldozer 100 (an exemplary construction machine) includes the GPS receiver 80 fixed to the vehicle body 10.

Therefore, since vibrations of the blade 40 can be thereby inhibited from being directly transferred to the GPS receiver 80, the GPS receiver 80 can accurately receive the GPS data. Further, the GPS receiver 80 can be protected from earth and sand splashed by the blade 40.

The bulldozer 100 further includes the angle obtaining part 210 which stores the conversion table in which the combination of the angling cylinder length L2 and the tilt cylinder length L3 is matched with the combination of the blade angling angle θ2 and the blade tilting angle θ3.

Therefore, since the blade angling angle θ2 and the blade tilting angle θ3 can be obtained much easier than the case that the blade angling angle θ2 and the blade tilting angle θ3 are calculated from the angling cylinder length L2 and the tilt cylinder length L3 through a complex geometric calculation, the processing load can be reduced.

Overall, according of the bulldozer 100 of the present exemplary embodiment, the GPS receiver 80 can accurately receive the GPS data while being protected, and the global position of the cutting edge 40P can be easily and simply calculated.

(2) In the bulldozer 100, the GPS receiver 80 is disposed on the vehicle body 10. Therefore, since the GPS receiver 80 is thus inhibited from being concealed by the vehicle body 10, the GPS receiver 80 can more accurately receive the GPS data.

Other Exemplary Embodiments

An exemplary embodiment of the present invention has been explained above, but the present invention is not limited to the aforementioned exemplary embodiment, and a variety of changes can be herein made without departing from the scope of the present invention.

(A) In the aforementioned exemplary embodiment, the combination of the angling cylinder length L2 and the tilt cylinder length L3 is matched with the combination of the blade angling angle θ2 and the blade tilting angle θ3 in the conversion table stored in the angle obtaining part 210, but the setting of the conversion table is not limited to the above. In the conversion table, the combination of the angling cylinder length L2 and the tilt cylinder length L3 may be matched with the combination of the blade lifting angle θ1, the blade angling angle θ2 and the blade tilting angle θ3. In this case, since it is not required to calculate the blade lifting angle θ1 from the lift cylinder length L1, the processing load can be further reduced.

(B) In the aforementioned exemplary embodiment, the GPS receiver 80 is disposed on the center part of the vehicle body 10 in the right-and-left direction, but the position of the GPS receiver 80 is not limited to the above. For example, the GPS receiver 80 may be disposed on the engine compartment 12.

(C) In the aforementioned exemplary embodiment, the cylinder lengths are configured to be converted into the angles using the conversion table represented in FIG. 5, but interpolation calculation may be executed when it is required to calculate a type of angle based on a type of cylinder length not contained in the table of FIG. 5. Specifically, when a cylinder length having a value in a range of two cylinder lengths contained in the table of FIG. 5, it is possible to calculate a target angle using two angles matched with the two cylinder lengths.

(D) In the aforementioned exemplary embodiment, the bulldozer has been explained as an exemplary "construction machine", but the construction machine is not limited to the bulldozer, and may be any suitable construction machines such as motor graders.

What is claimed is:

1. A construction machine, comprising:
   a vehicle body;
   a lift frame vertically pivotably attached to the vehicle body;
   a work implement supported by a tip of the lift frame;
   a lift cylinder;
   an angling cylinder;
   a tilt cylinder;
   an angle obtaining part configured to obtain a blade lifting angle, a blade angling angle and a blade tilting angle based on a lift cylinder length of the lift cylinder, an angling cylinder length of the angling cylinder and a tilt cylinder length of the tilt cylinder;
   a GPS receiver fixed to the vehicle body, the GPS receiver configured to receive GPS data indicating a position of the GPS receiver; and
   a global position obtaining part configured to obtain a position of the work implement in a global coordinate system based on the GPS data, the blade lifting angle, the blade angling angle and the blade tilting angle, the GPS data being received by the GPS receiver, the blade lifting angle, the blade angling angle and the blade tilting angle being obtained by the angle obtaining part,
   the angle obtaining part storing a conversion table for matching a combination of the angling cylinder length and the tilt cylinder length with a combination of the blade angling angle and the blade tilting angle.

2. The construction machine according to claim 1, wherein the conversion table is used for converting the lift cylinder length into the blade angle.

3. The construction machine according to claim 1, wherein the GPS receiver is disposed on the vehicle body.

4. The construction machine according to claim 3, wherein the GPS receiver is disposed on a center part of the construction machine in a right-and-left direction.

5. The construction machine according to claim 1, wherein the conversion table is created by sequentially matching the combination of the angling cylinder length and the tilt cylinder length with the combination of the blade angling angle and the blade tilting angle in a three-dimensional model formed based on the vehicle body, the lift frame, the work implement, the lift cylinder, the angling cylinder and the tilt cylinder.

6. The construction machine according to claim 1, further comprising:
   a drive unit including a pair of tracks attached to the vehicle body.

* * * * *